March 15, 1927.  1,620,707
G. WÜNSCH
DEVICE FOR REGULATING GAS PRESSURE
Original Filed Feb. 29, 1924
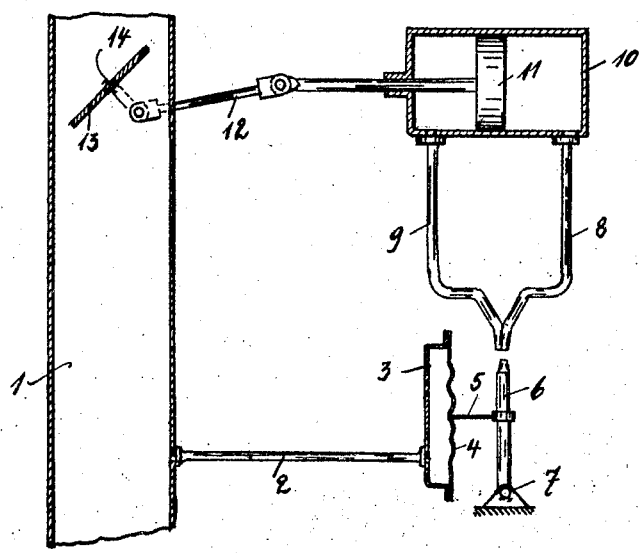
Inventor:
Erich Paul Guido Wünsch
by [signature] attorney Patented Mar. 15, 1927.

1,620,707

UNITED STATES PATENT OFFICE.

GUIDO WÜNSCH, OF STEGLITZ, NEAR BERLIN, GERMANY.

DEVICE FOR REGULATING GAS PRESSURE.

Original application filed February 29, 1924, Serial No. 696,103, and in Germany March 7, 1923. Divided and this application filed February 20, 1925. Serial No. 10,717.

My application for Letters Patent Serial No. 696,103 of which the present application is a divisional one relates to a process and means for the frictionless transmission of movement from a moving primary element to a secondary element to be moved, which can be utilized in various branches of industry. According to the said invention a very slight movement is transmitted from a primary element, for instance such as is usually automatically effected on the said element by an instrument, to a secondary controlling or setting element or to a servomotor, whereupon the said secondary element or servomotor effects the required operation.

The present invention relates to a practical application of the devices claimed in the said copending application and shows how the said process and means may be used in connection with gas pressure regulators.

The accompanying drawing illustrates diagrammatically a device for regulating gas pressure according to the invention.

The gas passes through a pipe 1 in the direction of the arrow. The pipe 1 is connected by a branch pipe 2 to a measuring box 3 closed by a diaphragm 4. The pressure differences produced in the pipe 1 will move the diaphragm 4 in either direction. The diaphragm is connected by a rod 5 to a pipe 6 which corresponds to the pipe $a$ or $a^1$ described with reference to Figures 1–3 of my application for Letters Patent Serial No. 696,103, and is oscillatable about a pin 7 in the easiest possible manner. Through the said pipe 6 passes a current of compressed air or of liquid under pressure. Opposite the nozzle of the pipe 6 are arranged the open ends of two pipes 8 and 9 which lead to the ends of a cylinder 10. The piston 11 mounted in the latter is connected by a rod 12 to a throttle valve 13 which is rotatable about a pin 14 in the pipe 1. When the pressure in the pipe 1 increases, the diaphragm 4 will be moved in such a manner that the pipe 6 will come closer to the opening of the pipe 8, that is to say it will allow the greater portion of the escaped liquid under pressure to pass into the pipe 8. Consequently the pressure on that side of the piston 11 at which the pipe 8 opens, will be greater, and the piston will move downwards and close the throttle valve 13 still more. When the pressure in the pipe 1 falls, the reverse movement of the pipe 6 will take place, towards the mouth of the pipe 9. The piston executes therefore a movement in the opposite direction and opens the throttle valve 13 to a greater extent. The throttle valve will be therefore eventually set so that the gas escaping from the pipe 1 will constantly have the same pressure.

I wish it to be understood that I have shown and described merely one example of the invention in connection with a certain system of gas pressure regulators. However it will be evident to those skilled in the art that it may be used also in connection with other kinds of such plants without departing from the spirit of the invention.

Having now particularly described and ascertained the nature of my said invention and in what manner the same is to be performed, I declare that what I claim is:

1. In a device for regulating gas pressure in combination a pressure pipe adapted to conduct a flow of the gas the pressure of which is to be regulated, a second pipe adapted to conduct a continuous flow of a medium under pressure, means adapted to move said last mentioned pipe corresponding to the rising and falling pressure in the said pressure pipe and means operated by the said medium escaping from said second pipe and adapted to effect the pressure regulation.

2. In a device for regulating gas pressure in combination a pressure pipe adapted to conduct a flow of the gas the pressure of which is to be regulated, a second pipe adapted to conduct a continuous flow of a medium under pressure, means adapted to move said last mentioned pipe corresponding to the rising and falling pressure in the said pressure pipe, and a servomotor controlled and operated by the said medium escaping from said second pipe and adapted to effect the pressure regulation.

3. In a device for regulating gas pressure in combination a pressure pipe adapted to conduct a flow of the gas the pressure of which is to be regulated, a second pipe adapted to conduct a continuous flow of a medium under pressure, means adapted to move said last mentioned pipe corresponding to the rising and falling pressure in the said pressure pipe, a servomotor controlled and operated by said medium and regulating means adapted to effect the pressure regulation and operated by said servomotor.

4. In a device for regulating gas pressure in combination a pressure pipe adapted to conduct a flow of the gas the pressure of which is to be regulated, a second pipe adapted to conduct a continuous flow of a medium under pressure, means adapted to move said last mentioned pipe corresponding to the rising and falling pressure in the said pressure pipe, a cylinder, a piston movable within said cylinder, further pipes one end of each of which opens into said cylinder at each of its ends respectively, the other free ends being arranged side by side and opposite the opening of the said second pipe and regulating means adapted to effect the pressure regulation and operated by said piston.

In testimony whereof I have affixed my signature.

GUIDO WÜNSCH.